June 30, 1936.  D. H. KNAPP  2,045,860
PNEUMATIC TIRE AND MOUNTING THEREFOR
Filed June 27, 1935
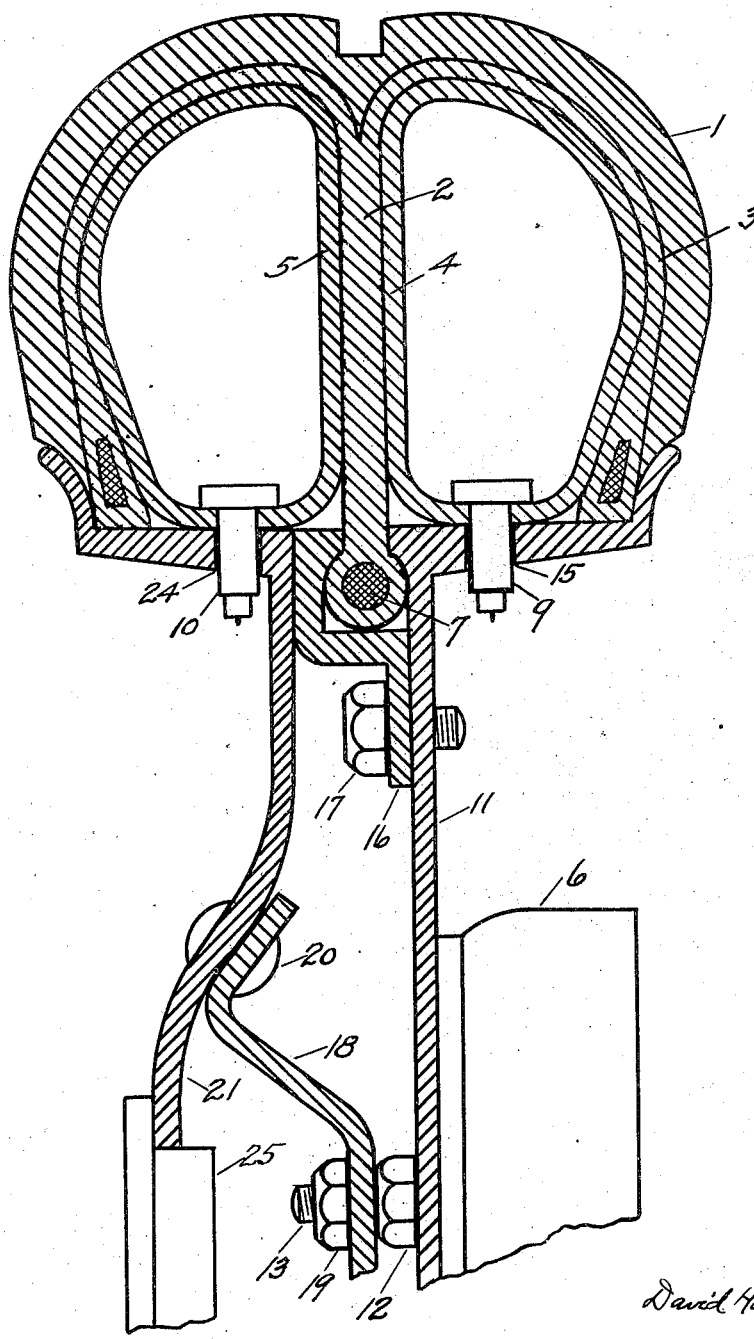
INVENTOR.
David Harold Knapp.

Patented June 30, 1936

2,045,860

UNITED STATES PATENT OFFICE 2,045,860

PNEUMATIC TIRE AND MOUNTING THEREFOR

David Harold Knapp, Philadelphia, Pa.

Application June 27, 1935, Serial No. 28,643

2 Claims. (Cl. 152—22)

My invention relates to that class of pneumatic tires that employ inflated inner tubes, and of tire mountings or rims that are detachable to the driving mechanism and also to the tire.

In pneumatic tires of this class, if for any reason the inner tube becomes deflated it is necessary to make immediate replacement or repair or damage will ensue to a generally expensive tire, as will also danger become apparent in the manual control of the vehicle due to the absence of a pneumatic tread. In addition it is found that difficult and experienced labor is entailed in removing a casing from the usual constructed rim, resulting in loss of time and of much inconvenience.

It is, therefore, the object of my said invention to first, provide a casing comprising a plurality, preferably two, circumferential inner tubes with independent inflating valves, separated from each other by a division wall preferably a projecting member integral with the casing, thereby forming a protection from one inner tube to the other in case one becomes damaged, thus permitting the undamaged tube to carry the load with safety and with reduced pressure; and second, to provide a novel construction of tire mounting wherein the casing may be detached therefrom with the use of simple tools in the least possible time and with the least effort. My invention further includes a novel arrangement and construction of parts as will hereinafter be more fully described and pointed out in the claims, references being had to the accompanying drawing forming part of the specifications and in which:—

The figure is a section through the tire showing the two inner tubes with their separating wall and the clamping ring for the projecting end of the wall, and also a view showing generally the construction of the mounting.

Referring to the drawing in which similar numerals of reference refer to similar parts throughout the view, the numeral 1 designates a casing provided with a fabric inner wall lining 3 firmly attached to the casing in the conventional manner. The said fabric inner wall is continuous from the outer rim of the casing to a point approximate the inner center of the casing where the two sides join forming a projecting inner or division wall 2. The said projecting inner wall extends inward to a point well below the inner circumference of the said casing 1 and terminates into a relative enlarged portion 7.

It is obvious, therefore, that the projecting inner wall divides the inside area of the casing into two equal annular compartments comprising a semi-section of the active tire tread with a common center or dividing wall 2.

Disposed in the compartments aforesaid are the annular inner tubes, designated by the numeral 4 in one compartment and the numeral 5 in the other. The said inner tubes are provided with independent air valves depending therefrom, in which the numeral 9 designates the air valve for the inner tube 4 and the numeral 10 designates the air valve for the inner tube 5. These valves are connected to their respective inner tubes in the conventional manner.

The numeral 6 designates a vehicle driving mechanism to which is demountably attached the inner disc member 11 by means of the nuts 12 engaging a stud 13 rigidly secured to the driving mechanism. The outer periphery of the said disc 11 terminates into a right angle flange with an upturned portion. The said right angle flange provides a base for the inner one half of the casing while the upturned portion provides a means to secure or anchor that side of the casing to the flange 11. This will be necessary in case the tube 4 needs repairing at which time both tubes will be removed from the rim to facilitate the work. The said flange is provided with a suitable aperture 15 through which the air valve 9 passes to an accessible position.

The numeral 16 designates an additional annular flange demountable and secured to the disc 11 by means of the bolt 17. The outer portion of the said flange 16 is designed to constitute a clamp which co-acting with the inner disc 11 forms a clamping means for the enlarged portion 7 of the projecting inner or dividing wall 2. It is obvious, therefore, that the inner tube 4 can be inflated to a predetermined pressure independent of the condition of the adjacent compartment. While I have shown the construction of the dividing wall 2 as a preferable construction it is obvious that a similar protection can be afforded if the dividing wall 2 was a simple floating partition disposed between the tubes, not attached either to the casing or secured to the rim.

The numeral 18 designates a disc demountably attached to the driving mechanism 6 by means of the nuts 19 in threaded engagement with the said stud 13. Secured to the said disc 18, at the outer extremity thereof, by means of the rivets 20, is an outer disc designated by the numeral 21. The outer periphery of the said disc 21 terminates into a right angle flange with an upturned portion similar in construction and for the purpose intended as the outward portion of the aforesaid disc 11. Disposed at the center of the disc 21, is the detachable hub cap 25, the removal of which exposes the nuts 19 for removal. The flange of the disc 21 is provided with a suitable aperture 24 through which the air valve 10 passes in order to make possible the inflation of the inner tube 5.

Having thus described the various parts throughout the view, its method of operation will be substantially as follows, all of which will be readily understood by those skilled in the art to which this invention relates. Assume the inner tube 5 or the inner tube 4 to become deflated from any cause whatever, the tire will continue to function under reduced inflation pressure so long as one tube remains in an operative condition. The reduced inflation pressure, however, will be slight and will be due to the slightly greater area occupied by the inner tube due to the general flexibility of the inner or dividing wall. The load on the wheel will be carried by that tire compartment provided with the inflated tube, thus preventing from running on a completely deflated tire, preventing damage, and also provide safe manual control until repairs can be conveniently made, thus accomplishing the first object of my said invention.

When repairs are to be made the wheel is placed in a free revolving position by means of a jack in the usual manner. The removal of the hub cap 25 will expose the nuts 19 which can be conveniently removed by a wrench which allows the discs 18 and 21 to be detached from the driving mechanism 6 and at the same time removal from the casing 1. It is obvious that should the inner tube 5 need repairs, then such can be made without disturbing the operative condition of the inner tube 4, as the annular ring 16 holds that tube intact either in an inflated or non-inflated condition. Upon removal of the discs 18 and 21, the nuts 17 securing the annular ring 16 will be exposed, which when removed will detach the said ring 16, thus permitting the casing as a whole to be removed from the disc 11. It is obvious that this operation is accomplished with simple tools and with the least effort, thus accomplishing the second object of my said invention.

I do not wish to limit myself to the exact construction as shown in the drawing as it is evident that certain departures can be made therefrom without departing from the spirit and intent of my said invention, but what I claim as new and desire to secure by Letters Patent is:—

1. In a pneumatic tire comprising a casing with an inward projecting wall whose inner periphery terminates in a substantially solid enlarged annular member, the said wall dividing the tire into two circumferentially annular compartments, each provided with an inner tube independently inflated, and a tire mounting comprising an inner disc and an outer disc adapted to anchor and support the said casing, and means to secure the said solid enlarged annular member of the said projecting wall, in removable relation, to the aforesaid inner disc, substantially as described.

2. In a pneumatic tire comprising a casing with an inward projecting wall whose inner periphery terminates in a substantially solid enlarged annular member, the said wall dividing the tire into two equal circumferentially annular compartments, each compartment provided with an inner tube independently inflated, and a tire mounting comprising an inner disc and an outer disc adapted to anchor and support the said casing, of an annular ring removably secured to the said inner disc and adapted to bind the said solid enlarged annular member of the said projecting wall to the aforesaid inner disc, substantially as described.

DAVID H. KNAPP.